United States Patent Office 3,234,255
Patented Feb. 8, 1966

3,234,255
ALPHA-SUBSTITUTED BENZALDOXIMES
Johannes Thomas Hackmann and Paulus Adriaan Harthoorn, Herne Bay, Kent, and Herbert Paul Rosinger, Sittingbourne, Kent, England, assignors to Shell Oil Company, New York, N.Y., a corporation of Delaware
No Drawing. Filed Nov. 16, 1961, Ser. No. 152,923
Claims priority, application Great Britain, Jan. 1, 1960, 131/60
8 Claims. (Cl. 260—454)

This invention relates to novel alpha-substituted benzaldoximes and to a process for their preparation. The invention also relates to the method of use of said compounds as pesticides, particularly fungicides, herbicides and molluscicides and to compositions containing said compounds. These compounds have excellent pesticidal properties. Some have excellent fungicidal properties, some have excellent herbicidal, particularly seedicidal properties and some show high toxicity to snails. This application is a continuation-in-part of copending application Ser. No. 78,871, filed December 28, 1960, and now abandoned.

The novel compounds of the invention are alpha-substituted benzaldoximes of the general formula

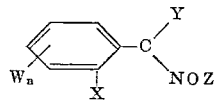

and salts thereof, wherein

X represents a halogen atom;
W represents a halogen atom or an alkyl group;
$n$ is the integer 1, 2, 3 or 4;
Y represents a halogen atom or a hydroxy, hydrocarbyloxy, cyano, thiocyano or nitro group or a group of formula —COOR' or —SO$_3$R' wherein R' represents a hydrogen atom or a hydrocarbyl group; or Y represents a group of formula —NR$^1$R$^2$ wherein R$^1$ and R$^2$ may be the same or different, each representing a hydrogen atom, a hydrocarbyl group, a hydrocarbyl group substituted by halogen or hydroxyl or a hydrocarbyl group substituted by halogen and hydroxyl, or R$^1$ represents a hydrogen atom or a hydrocarbyl group and R$^2$ represents a hydroxyl group or the group —NR$^3$R$^4$ wherein R$^3$ and R$^4$ may be the same or different, each representing a hydrogen atom or a hydrocarbyl group; or Y represents a group of formula —NR$^5$·CO·NR$^6$R$^7$ or —NR$^5$·CS·NR$^6$R$^7$, or a tautomeric form thereof, wherein R$^5$, R$^6$ and R$^7$ may be the same or different, each representing a hydrogen atom or a hydrocarbyl group; or Y represents a group of formula —SR$^8$ or —SO$_x$R$^9$ wherein $x$ is 1 or 2 and R$^8$ represents a hydrogen atom or R$^8$ and R$^9$ each represent a hydrocarbyl group, or a hydrocarbyl group substituted by halogen; Z represents a hydrogen atom, an acyl group or an alkoxylcarbonyl group..

The alpha-substituted benzaldoximes of the above general formula can exist as syn- or anti-isomers or as mixtures thereof and the present invention relates to any or all of these forms.

In the above formula, the halogen in each case is preferably chlorine or bromine, but fluorine and iodine are also possible as nuclear substituents. Where two or more halogen atoms are present in the molecules, the atoms may be of the same or different halogens. In general, the activity of herbicidal compounds is favored by the presence of 2,6-dihalo substituents, while in the fungicidally active alpha-cyano benzaldoximes, the 2,4-dihalo derivatives are at least as active as the 2,6-dihalo derivatives.

The term hydrocarbyl used herein means a hydrocarbon group and the term "hydrocarbyloxy" means a group OR" in which R" represents a hydrocarbyl group. The hydrocarbyl group may be a saturated or unsaturated aliphatic or cycloaliphatic hydrocarbon group, preferably an alkyl group of 1 to 4 carbon atoms, or an aromatic hydrocarbon group; preferably a phenyl group.

In the above general formula, Y may represent a hydrocarbyloxy group. This is preferably an alkoxy group of 1 to 4 carbon atoms. W is preferably alkyl of 1 to 4 carbon atoms.

When R' in the group —COOR' or —SO$_3$R' represents a hydrocarbyl group, this is preferably an alkyl group of 1 to 4 carbon atoms.

The hydrocarbyl or substituted hydrocarbyl groups which R$^1$ or R$^2$, or R$^1$ and R$^2$ in the group —NR$^1$R$^2$ may represent, are preferably saturated or unsaturated aliphatic hydrocarbon groups of 1 to 4 carbon atoms, e.g., alkyl, which may be unsubstituted or substituted by hydroxyl, or halogen, preferably chlorine.

Y may also represent the group —NR$^1$OH, R$^1$ preferably representing a hydrogen atom or an aryl group, especially a phenyl group.

Y may also represent the group —NR$^1$·NR$^3$R$^4$. Here R$^1$ is preferably a hydrogen atom but may be a hydrocarbyl group, for example, an alkyl group of 1 to 4 carbon atoms. Preferably R$^3$ and R$^4$ each represent a hydrogen atom or R$^3$ represents a hydrogen atom and R$^4$ represents a phenyl group.

In the ureido and thioureido groups —NR$^5$·CO·NR$^6$R$^7$ and —NR$^5$·CS·NR$^6$R$^7$, R$^5$, R$^6$ and R$^7$ preferably each represent a hydrogen atom or one or more of R$^5$, R$^6$ and R$^7$ may represent an alkyl group of 1 to 4 carbon atoms or one may represent a phenyl or chlorinated phenyl group. Tautomeric forms of the ureido group are

or

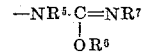

Tautomeric forms of the thioureido group are similar.

Examples of the above nitrogen containing groups are:
—NH$_2$, —NHCH$_3$, N(CH$_3$)$_2$ and its homologues;

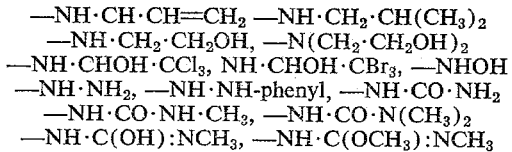

—NH·CO·NH-phenyl and the thio analogues thereof. When in the group —NR$^1$R$^2$, R$^1$ and R$^2$ together with the nitrogen atom complete a heterocyclic ring, this ring may contain one or more hetero atoms, for example, piperidyl, morpholinyl, thiazolyl or thiazolinyl groups.

The hydrocarbyl groups which R$^8$ and R$^9$ may represent may suitably be phenyl groups or phenyl groups substituted by alkyl, preferably methyl, or by halogen, preferably chlorine. R$^8$ and R$^9$ may also represent alkyl groups, preferably of 1 to 4 carbon atoms.

Compounds of the invention in which Y represents a nitrogen-containing group as specified above may be either in the form of the free base or preferably in the form of a salt with an acid. The acid used may be a mineral acid, e.g., hydrochloric acid, nitric acid, sulfuric acid, etc., or an organic acid, e.g., acetic acid, lactic acid, etc.

Compounds of the invention containing one or more acidic groups, for example compounds in which Y represents a carboxylic or sulphonic acid group, or a thiol group, or in which Z represents the group =NOH, may be in the form of the free acid or of a salt. The salt may be an alkali or alkaline earth metal especially sodium, potassium or calcium salt, an ammonium or substituted ammonium salt, for example, a triethylammonium or an alkanolammonium, especially a triethanolammonium salt.

In compounds of the above general formula in which Z represents an acyl group, the acyl group may, for example, be the radical of an aliphatic or aromatic carboxylic, sulphonic, phosphoric or phosphonic acid. The acyl group may be unsubstituted or may be substituted by halogen, preferably chlorine. Preferably, the acyl group is the radical of an aliphatic or chlorinated aliphatic carboxylic acid of 1 to 4 carbon atoms, for example, an acetyl or mono-, di- or trichloro-acetyl group. Where Z represents an alkoxycarbonyl group, it suitably contains 2 to 4 carbon atoms.

Compounds of the above general formula in which Y is a hydrogen atom may be obtained by reacting the corresponding aldehyde with hydroxylamine according to methods well-known in the art.

Compounds of the above general formula in which Y represents a halogen atom, particularly chlorine, may be prepared by introducing the dry halogen into a solution of the corresponding nuclear substituted aldoxime in an inert solvent, for example, chloroform or carbon tetrachloride. It is advantageous to carry out the halogenation in presence of a neutralising agent, for example, precipitated calcium, barium or magnesium carbonate, in order to suppress undesirable side reactions.

The alpha-halogen atom of the alpha-halobenzaldoxime can be replaced by the radical of another acid by reacting it with a salt of said acid, preferably an alkali metal salt, especially a sodium or potassium salt thereof. Thus, the alpha-halobenzaldoxime may be reacted with an alkali metal cyanide, thiocyanate, mercaptide, alkoxide, or sulphinate to give the corresponding alpha-cyano, alpha-thiocyano, alpha-mercapto, alpha-alkoxy or alpha-hydrocarbyl-sulphonyl benzaldoximes. The reaction is preferably carried out in an alcoholic solvent, for example, methanol or ethanol. The alpha-hydroxy compound can be prepared by reacting the alpha-halo-benzaldoxime with an alkali metal hydroxide in an aqueous or alcoholic solvent. Similarly, by reacting the alpha-halobenzaldoxime with a compound $HNR^1R^2$ where $R^1$ and $R^2$ have the aforesaid meanings, the corresponding alpha-amino and alpha-substituted aminobenzaldoximes can be prepared. The alpha-amino and alpha-substituted-aminobenzaldoximes may also be prepared by reacting the corresponding benzonitrile oxides with the compound $HNR^1R^2$. The reaction may be expressed by the equation: $R \cdot CN \to O + HNR^1R^2 \to R \cdot C(NR^1R^2) = E \cdot H$ wherein R represents a benzene nucleus substituted as hereinbefore specified. The alpha-aminobenzaldoximes may also be prepared by addition of hydroxylamine to the nitrile group of the corresponding substituted benzonitrile. An aqueous alcoholic reaction medium may be used. The reactions are preferably carried out under anhydrous conditions in a solvent, for example, absolute alcohol or dry ether.

Ureido and thioureido derivatives may be prepared by isomerising the cyanic and thiocyanic acid salts of primary or secondary alpha-aminobenzaldoximes of the invention. Substituted ureido and thioureido derivatives may be prepared by reacting a primary or secondary alpha-aminobenzaldoxime of the invention with an ester of isocyanic or isothiocyanic acid, for example, the phenyl ester.

By reacting the alpha-aminobenzaldoxime with chloral or bromal, the alpha-(2-trihalo-1-hydroxyethylamino) derivatives can be prepared.

The alpha-cyanobenzaldoximes may also be prepared by reacting the corresponding benzyl cyanide with nitrous acid. The alpha-nitrobenzaldoximes may be prepared by reacting the corresponding aldoximes with concentrated nitric acid, preferably in an inert solvent, for example glacial acetic acid, the temperature preferably being maintained below about 15° C. The product is contaminated with the nitrile oxide formed by decomposition of the nitrolic acid. The nitrolic acid can be isolated by extracting a solution of the nitration product in a solvent, for example methylene dichloride, with aqueous ammonia and then carefully acidifying the ammonia solution, for example, with hydrochloric, sulphuric or oxalic acid. Alternatively, a solution of the nitration product in a water-soluble solvent, for example, glacial acetic acid, can be progressively diluted with water, the nitrile-oxide precipitating first, followed on further dilution by the nitrolic acid as a yellow solid. It can be purified by conversion to the ammonium salt and re-acidification as described above.

Compounds of the above general formula in which Z represents an acyl group can be prepared by reacting the aldoxime with an acylating agent such as an acid anhydride or acid chloride or ester of a volatile alcohol according to methods well-known in the art. Since acid chlorides such as acetyl chloride are powerful dehydrating agents, however, it is necessary to work under very mild conditions when using these reagents to avoid converting the oxime to the nitrile. Mild reaction conditions should also be employed when acid anhydrides such as acetic anhydride are used.

Compounds of the above general formula in which Z represents an alkoxycarbonyl group can be prepared by reacting an alkyl chloroformate with the aldoxime in presence of a hydrogen chloride acceptor, for example, a tertiary base, or with a salt, preferably an alkali metal salt of the oxime.

Salts of benzaldoximes of the above general formula having a basic substituent in the alpha-position may be prepared by reacting the base with an inorganic or organic acid preferably in a solvent, for example ether, and preferably under anhydrous conditions. By reaction in an aqueous medium, aqueous solutions of the salts can be obtained.

The following examples illustrate the process of the invention. In these examples, parts by weight and parts by volume bear the same relation as the kilogram and liter.

EXAMPLE I.—PREPARATION OF ALPHA-2,4-TRICHLOROBENZALDOXIME

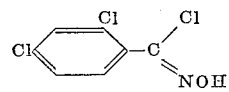

To a stirred suspension of 2,4-dichlorobenzaldoxime (19 w.) in dry chloroform (200 v.) was added a solution of chlorine (7.5 w.) in dry carbon tetrachloride (110 v.), the reaction temperature being maintained at 10° to 20° C. The oxime gradually dissolved to give a clear deep blue solution, becoming pale yellow on standing, while hydrogen chloride was evolved. The solvents were stripped off under reduced pressure. The residue (21 w.) was treated with about 50 v. of hot light petroleum (60°/80° C.) and filtered and then had M.P. 95° to 97° C.

Analysis.—Found: Cl, 47.0%. $C_7H_4ONCl_3$ requires: Cl, 47.4%.

2-bromo-alpha-6-dichlorobenzaldoxime was prepared in a similar way by chlorinating 2-bromo-6-chlorobenzaldoxime. It had a M.P. 110° to 113° C.

Analysis.—Found: C, 31.1; H, 1.7; N, 5.4; Cl, 26.7%. $C_7H_4ONCl_2Br$ requires: C, 31.2; H, 1.5; N, 5.2; Cl, 26.4%.

Alpha-2-dichloro-6-fluorobenzaldoxime was prepared in a similar way by chlorinating 6-chloro-2-fluorobenzaldoxime.

EXAMPLE II.—PREPARATION OF ALPHA-2,6-TRICHLOROBENZALDOXIME AND ITS O-ACETYL DERIVATIVE

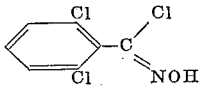

Into a suspension of 2,6-dichlorobenzaldoxime (19 w.) in carbon tetrachloride (200 v.), was passed chlorine until nearly all the oxime had gone into solution, the temperature of the reaction mixture being kept below 15° C. The green solution obtained was evacuated to remove excess chlorine, the solvent and a volatile substance causing a blue odor, presumably nitrosyl chloride. The residue (21.2 w.) partly crystallised on standing. The residue was dissolved in 100 v. of hot 60°/80° C. light petroleum. On cooling colorless leaflets (10 w.), M.P. 89° to 94° C. were obtained. These were filtered off and recrystallized from 60°/80° C. petroleum ether and then had M.P. 93.5° to 94.5° C.

*Analysis.*—Found: C, 37.1; H, 1.9%. $C_7H_4ONCl_3$ requires: C, 37.4; H, 1.8%.

A yellow oil isolated from the mother liquor has been identified as 2,6-dichlorobenzal dichloride.

The O-acetyl derivative was obtained by heating alpha-2,6-trichlorobenzaldoxime (10 w.) and acetic anhydride (10 v.) together on a water bath for one hour. The product partly crystallized and the crystals collected by filtration with suction. A second crop was obtained by adding the filtrate to aqueous sodium bicarbonate and filtering. The combined crops were recrystallized from hot glacial acetic acid. The product obtained had M.P. 106° C. Yield 6.5 w.

*Analysis.*—Found: C, 40.2; H, 2.3; N, 5.4%. $C_9H_6O_2NCl_3$ requires: C, 40.5; H, 2.3; N, 5.3%.

EXAMPLE III.—PREPARATION OF 2,6-DICHLOROBENZONITROLIC ACID

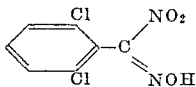

To a stirred solution of 2,6-dichlorobenzaldoxime (5 w.) in glacial acetic acid (50 v.), concentrated nitric acid (70% w./w., d. 1.42; 2 v.) was added dropwise, the temperature of the reaction mixture being kept below 15° C. The mixture was then poured into ice water (300 v.) and the aqueous mixture extracted with methylene dichloride. The extract was dried with calcium chloride and the solvent then removed under reduced pressure. The residue was taken up in glacial acetic acid and water then added gradually to the solution. A first precipitate of 2,6-dichlorobenzonitrile N-oxide, M.P. 75° to 77° C., formed by decomposition of some of the nitrolic acid, was separated. Further addition of water precipitated a yellow solid from which the desired nitrolic acid was isolated by extracting the ethereal solution with aqueous ammonia (25% w./v.) until the extracts were no longer colored, and then carefully acidifying the filtered extracts with aqueous sulphuric acid (6 N). The resulting precipitate was filtered off with suction, washed with cold water and dried at a low temperature in a vacuum. The temperature throughout the above process was maintained at below 15° C. The product had M.P. 62° C., decomp.

In another preparation, the methylene dichloride extract of the aqueous nitration mixture was extracted 3 times with 30 v. portions of 0.5–1.0 N aqueous ammonia until the ammonia extracts were no longer colored. The combined ammonia extracts, which were deep orange-red in color, were washed once with 50 v. of methylene chloride, filtered and carefully acidified with hydrochloric acid. Aqueous sulphuric or oxalic acid can be used instead of hydrochloric acid. The precipitate which separated was filtered off by suction washed with cold water and dried at a low temperature in a vacuum. The temperature throughout was kept at 10° to 15° C. The product had M.P. 61–2° C., decomp.

EXAMPLE IV.—PREPARATION OF ALPHA-CYANO-2,4-DICHLOROBENZALDOXIME

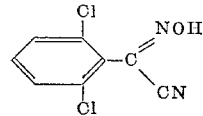

Sodium (2.3 w.) was dissolved in ethanol (80.0 v.), the solution cooled to 0° C. and amyl nitrite (14.6 v.) added. A solution of 2,4-dichlorobenzyl cyanide (19.0 w.) in ethanol was then added and the mixture left overnight. The precipitated sodium salt of the alpha-cyanobenzaldoxime was dissolved in water and treated with dilute acetic acid. The free oxime so obtained was recrystallized from benzene. Yield 12.1 w. (55%); M.P. 151° C.

*Analysis.*—Found: C, 44.7; H, 2.0; N, 13.2%. $C_8H_4ON_2Cl_2$ requires: C, 44.7; H, 1.9; N, 13.0%.

EXAMPLE V.—PREPARATION OF ALPHA-CYANO-2,6-DICHLOROBENZALDOXIME

To a stirred solution of alpha-2,6-trichlorobenzaldoxime (6.7 w.) in ethanol (50 v.) was added gradually a solution of sodium cyanide (2.5 w.) in water (10 v.) during which the temperature of the mixture rose to about 45° C. The mixture was heated at 50° to 60° C. for 30 minutes, then cooled and filtered. The filtrate was evaporated to dryness, the residue dissolved in water, the solution acidified with 3 N hydrochloric acid and extracted twice with methylene dichloride (20 v. each time). The combined extracts were dried with calcium chloride and evaporated to dryness. The residue was recrystallized from carbon tetrachloride. Yield 3.8 w.; M.P. 118° to 120° C.

*Analysis.*—Found: C, 44.6; H, 1.8; Cl, 33.9%. $C_8H_4ON_2Cl_2$ requires: C, 43.8; H, 1.9; Cl, 33.0%.

EXAMPLE VI.—PREPARATION OF ALPHA-THIOCYANATO-2,6-DICHLOROBENZALDOXIME

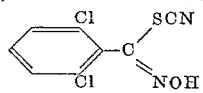

To a solution of alpha-2,6-trichlorobenzaldoxime (6.7 w.) in alcohol (50 v.) was added a solution of potassium thiocyanate (5 w.) in water (10 v.). The temperature of the mixture rose to about 35° C. The mixture was warmed at 50° to 60° C. for 30 minutes, filtered and the filtrate evaporated to dryness. The residue was dissolved in methylene dichloride, the solution washed with water until free from thiocyanate ion, then evaporated to dryness. The residue was recrystallized from carbon tetrachloride. Yield 3.2 w.; M.P. 128° to 131° C.

*Analysis.*—Found: C, 37.6; H, 2.0; Cl, 25.6; S, 14.5%. $C_8H_4ON_2Cl_2S$ requires: C, 38.8; H, 1.6; Cl, 28.8; S, 13.1%.

EXAMPLE VII.—PREPARATION OF ALPHA-PHENYLSULPHONYL-2,6-DICHLOROBENZALDOXIME

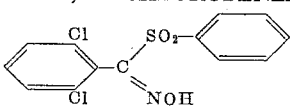

Solutions of sodium benzenesulphinate dihydrate (10.0 w.) in methanol (50 v.) and of alpha-2,6-trichlorobenzaldoxime (10.0 w.) in methanol (50 v.) were mixed. The precipitate of sodium chloride was filtered off, the filtrate evaporated to dryness and the residue crystallized from benzene. The product obtained (12.8 w.) had M.P. 147° to 148° C. decomp.

*Analysis.*—Found: C, 47.6; H, 2.8; Cl, 20.8; S, 9.1%. $C_{13}H_9O_3NCl_2S$ requires: C, 47.2; H, 2.7; Cl, 21.5; S, 9.7%.

The product recrystallized from methanol with one molecule of methanol of crystallization.

*Analysis.*—Found: C, 46.5; H, 3.5, Cl, 20.4; S, 9.4%. $C_{13}H_9O_3NCl_2S \cdot CH_3OH$ requires: C, 46.4; H, 3.6; Cl, 19.6; S, 8.9%.

EXAMPLE VIII.—PREPARATION OF ALPHA-(4-METHYLPHENYLTHIO) - 2,6 - DICHLOROBENZALDOXIME

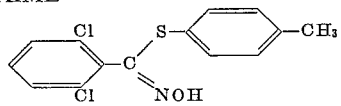

A solution of alpha-2,6-trichlorobenzaldoxime (6.0 w.) in methanol (25 v.) was added to a mixture of p-thiocresol (3.2 w.) in methanol (10 v.) and sodium (4.6 w.) dissolved in methanol (10 v.) The reaction mixture was kept at 25° to 30° C. by external cooling. The colorless precipitate was filtered off and washed with water. Yield 7.3 w.; M.P. 211° C.

*Analysis.*—Found: C, 53.2; H, 4.3; S, 10.3%. $C_{14}H_{11}ONSCl_2$ requires: C, 53.8; H, 3.5; S, 10.3%.

EXAMPLE IX.—PREPARATION OF ALPHA-AMINO-2,6-DICHLOROBENZALDOXIME

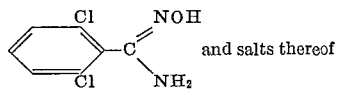

and salts thereof

To a solution of alpha-2,6-trichlorobenzaldoxime (1 mol.) in absolute alcohol was added dry ammonia (2 mols.) in absolute alcohol. Ammonium chloride separated and was filtered off. More ammonium chloride separated on adding ether to the filtrate and was also removed. Dry hydrogen chloride (0.1 mol.) in ether was added to the filtrate. Colorless crystals, M.P. 220° C. of the desired hydrochloride separated on standing. Yield 75% theory.

*Analysis.*—Found: Cl, 44.0%. $C_7H_7ON_2Cl_3$ requires: Cl, 44.1%.

The hydrochloride was dissolved in a little distilled water and the theoretical quantity of sodium hydroxide dissolved in a little water added with stirring. The free amine precipitated immediately as a colorless solid. This was filtered off, washed free from salt with cold water and product dried and recrystallized from methanol. It had M.P. 167° C. Quantitative yield.

*Analysis.*—Found: C, 41.2; H, 3.0%. $C_7H_6ON_2Cl_2$ requires: C, 41.0; H, 2.9%.

The following salts were prepared in 5% aqueous solution by reacting alpha-amino-2,6-dichlorobenzaldoxime (B) with the equivalent amount of acid in water: $B \cdot \frac{1}{2}H_2SO_4$, $B \cdot H_3PO_4$, $B \cdot HNO_3$, $B_2 \cdot (COOH)_2$, $B \cdot HClO_4$.

EXAMPLE X

Alpha-amino-2,4-dichlorobenzaldoxime hydrochloride (M.P. 190° C., decomp.) was prepared from alpha-2,4-trichlorobenzaldoxime by a process analogous to that described in Example IX.

EXAMPLE XI

Alpha - amino-2-chloro - 6 - fluorobenzaldoxime (M.P. 131° to 134° C.) and its hydrochloride (M.P. 195° to 197° C., decomp.) were prepared from alpha-2-dichloro-6-fluorobenzaldoxime by a process analogous to that described in Example IX.

*Analysis.*—Base found: Cl, 18.8%. $C_7H_6ON_2ClF$ requires, Cl, 18.8%. Hydrochloride found: Cl, 31.8%. $C_7H_6ON_2Cl_2F$ requires: Cl, 31.6%.

EXAMPLE XII

Alpha-amino-2 - bromo - 6 - chlorobenzaldoxime (M.P. 175° to 178° C.) was prepared from 2-bromo-alpha-6-dichlorobenzaldoxime by a process analogous to that described in Example IX.

*Analysis.*—Found: C, 33.1; H, 2.6; N, 11.3%.

$$C_7H_6ON_2Cl_2Br$$

requires: C, 33.7; H, 2.4; N, 11.2%.

EXAMPLE XIII.—PREPARATION OF ALPHA-PIPERIDYL-2,6-DICHLOROBENZALDOXIME

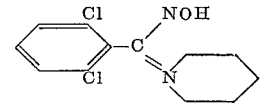

Piperidine (2 mols.) was added gradually to a solution of alpha-2,6-trichlorobenzaldoxime (1 mol.) in dry ether at room temperature. Piperidine hydrochloride separated and was filtered off and the ether removed from the filtrate. The residue was recrystallized from methanol and the product then obtained as colorless crystals, M.P. 172° C., in quantitative yield.

*Analysis.*—Found: Cl 25.9%. $C_{12}H_{14}ON_2Cl_2$ requires: Cl, 26.0%.

By replacing piperidine in the above process by the bases stated below, the following alpha-substituted-2,6-dichlorobenzaldoximes were prepared. The hydrochlorides were prepared by the method of Example IX.

| Base | α-substituent | M.p., ° C. | Analysis | | | | | |
|---|---|---|---|---|---|---|---|---|
| | | | Found | | | Theory | | |
| | | | C | H | Cl | C | H | Cl |
| Diethanolamine | —N(CH₂·CH₂·OH)₂ | 135 | 45.0 | 4.8 | | 45.0 | 4.8 | |
| Ethanolamine | —NHCH₂·CH₂·OH | 175 | 43.2 | 4.2 | 29.2 | 43.4 | 4.0 | 28.6 |
| Allylamine | —NHCH₂·CH=CH₂ | 125 | 49.7 | 4.2 | 29.9 | 49.0 | 4.1 | 29.0 |
| | —NH·CH₂·CH=CH₂·HCl | ¹ 207 | | | 38.2 | | | 37.9 |
| Methylamine | —NHCH₃ | 162 | 43.1 | 3.7 | | 43.8 | 3.7 | |
| | —NHCH₃·HCl | ¹ 207 | | | 42.2 | | | 41.7 |
| Dimethylamine | —N(CH₃)₂ | 122 | 46.2 | 4.4 | | 46.4 | 4.3 | |
| Isobutylamine | —NH·CH₂·CH(CH₃)₂ | 143 | 50.2 | 5.5 | | 50.6 | 5.4 | |
| Morpholine | —N(CH₂·CH₂)₂O | 160 | | | 26.2 | | | 25.8 |

¹ Decomp.

EXAMPLE XIV.—PREPARATION OF ALPHA-HYDROXYLAMINE - 2,6 - DICHLOROBENZALDOXIME HYDROCHLORIDE

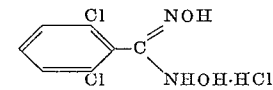

A solution of alpha-2,6-trichlorobenzaldoxime (5 w.; 1 mol.) in ethanol (50 v.) was added to a solution of hydroxylamine (2.1 w.; 2 mols.) in ethanol (50 v.) at room temperature. The reaction mixture was concentrated to low volume at room temperature under reduced pressure. Dry ether was then added and the precipitated hydroxylamine hydrochloride was filtered off. A solution of excess hydrogen chloride in dry ether was added to the filtrate and the precipitated alpha-hydroxylamino-2,6-dichlorobenzaldoxime hydrochloride was separated and recrystallized from a mixture of ethanol and benzene, the purified product being obtained in 50% yield. It had M.P. 170° C., decomp.

Analysis.—Found: Cl, 41.5%. $C_7H_7O_2N_2Cl_3$ requires: Cl, 41.4%.

EXAMPLE XV.—PREPARATION OF ALPHA-HYDRAZINO-2,6-DICHLOROBENZALDOXIME

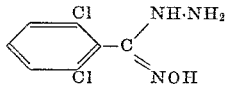

Hydrazine hydrate (11 w. of 98% w./w.) in ethanol (10 v.) was added to alpha-2,6-trichlorobenzaldoxime (12.5 w.) in ethanol (100 v.). Hydrazine hydrochloride (2.5 w.) separated after some time and was filtered off. The filtrate was evaporated to dryness and the oily residue shaken with water for 3 hours. A pink solid formed and was filtered off (4.7 w.). It was recrystallized from a mixture of ether and methanol. The product obtained decomposed at 108° to 109° C.

Analysis.—Found: C, 38.3; H, 3.4; Cl, 31.8%. $C_7H_7ON_3Cl_2$ requires: C, 38.2; H, 3.2; Cl, 32.3%.

From the ether-methanol mother liquor, an unidentified crystalline material, M.P. 144° to 145° C., was recovered.

EXAMPLE XVI.—PREPARATION OF ALPHA-PHENYLHYDRAZINE-2,6-DICHLOROBENZALDOXIME

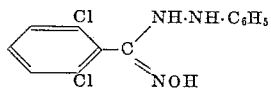

Phenylhydrazine (2 mols.) was added to a solution of alpha-2,6-trichlorobenzaldoxime (1 mol.) in dry ether. Phenylhydrazine hydrochloride separated immediately. It was filtered off and the ethereal filtrate evaporated. The residue was recrystallized from methanol and then had M.P. 147° C. Yield 80% theory.

Analysis.—Found: Cl 24.2%. $C_{13}H_{11}ON_3Cl_2$ requires: Cl, 24.0%.

EXAMPLE XVII.—PREPARATION OF ALPHA-AMINO-2-CHLORO-6-METHYLBENZALDOXIME AND ITS HYDROCHLORIDE

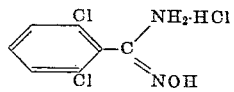

A mixture of 2-chloro-6-methylbenzonitrile (11.5 w.), hydroxylamine hydrochloride (10.4 w.), potassium carbonate (anhydrous 10.4 w.), isopropanol (100 v.) and water (50 v.) was refluxed for 53 hours. The reaction mixture was then steam distilled to remove isopropanol and unchanged nitrile (1 w.) and then cooled, whereupon 2-chloro-6-methylbenzamide (6.2 w.; M.P. 167° to 172° C.) separated.

The mother liquor was concentrated under reduced pressure, then made alkaline with concentrated aqueous sodium hydroxide solution and the mixture extracted with ether. The ethereal extract was dried with calcium chloride and a dry solution of hydrogen chloride in ether was added. The resulting precipitate was filtered off, washed with ether and dried. Yield 3.5 w.; decomposes at 193° C.

Analysis.—Found: C, 43.8; H, 4.8; N, 12.8; Cl 31.5%. $C_8H_{10}ON_2Cl_2$ requires: C, 43.4; H, 4.5; N, 12.7; Cl. 32.1%.

EXAMPLE XVIII.—PREPARATION OF ALPHA-UREIDO-2,6-DICHLOROBENZALDOXIME

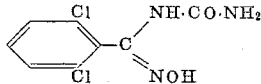

An aqueous solution of 2,6-dichloro-alpha-aminobenzaldoxime hydrochloride was treated with an aqueous solution of potassium cyanate. The ureido compound precipitated immediately. It was filtered off and recrystallized from ethanol. The product had M.P. 190° C. Yield 97.5% theory.

Analysis.—Found: Cl, 28.4%. $C_8H_7O_2N_3Cl_2$ requires: Cl, 28.6%.

Alpha-ureido-2,4-dichlorobenzaldoxime was prepared in a similar way from 2,4-dichloro-alpha-aminobenzaldoxime. After recrystallization from aqueous alcohol, the product had M.P. 165° C. Yield practically quantitative.

Analysis.—Found: C, 38.7; H, 3.2%. $C_8H_7O_2N_3Cl_2$ requires: C, 38.7; H, 2.7%.

EXAMPLE XIX.—PREPARATION OF ALPHA-(2-TRICHLORO-1-HYDROXYETHYLAMINO)-2,6-DICHLOROBENZALDOXIME

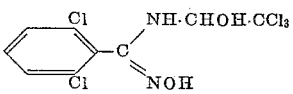

Alpha-amino-2,6-dichlorobenzaldoxime (10.3 w.) was dissolved in hot benzene and treated with anhydrous chloral (5 v.). On cooling, the desired product precipitated and was filtered off and recrystallized once from benzene. It then had M.P. 162° C. Yield practically quantitative.

Analysis.—Found: C, 30.9; H, 2.1; N, 7.6; Cl, 49.8%. $C_9H_7O_2N_2Cl_5$ requires: C, 30.6; H, 2.0; N, 7.9; Cl, 50.3%.

EXAMPLE XX.—PREPARATION OF O-TRICHLOROACETYL-ALPHA-AMINO-2,6-DICHLOROBENZALDOXIME

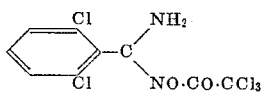

Trichloroacetyl chloride (9.1 w.) in dry ether (30 v.) was added gradually to a stirred solution of alpha-amino-2,6-dichlorobenzaldoxime (10.3 w.) and triethylamine (5.1) in dry ether (70 v.) Triethylamine hydrochloride was precipitated and was filtered from the mixture. The filtrate was concentrated and the desired product crystallized from the concentrate as colorless crystals, M.P. 163° C.

Analysis.—Found: C, 43.0; H, 3.6%. $C_{10}H_{10}O_3N_2Cl_2$ requires: C, 43.3; H, 3.6%.

EXAMPLE XXI.—PREPARATION OF O-ETHOXYCARBONYL-ALPHA-AMINO-2,6-DICHLOROBENZALDOXIME

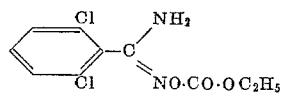

Ethyl chloroformate (5.5 w.) in dry ether (30 v.) was added gradually to a stirred solution of alpha-amino-2,6-dichlorobenzaldoxime (10.3 w.) and triethylamine (5.1 w.) in dry ether (70 v.). The precipitate of triethylamine hydrochloride formed was filtered off and the filtrate concentrated. The desired product separated from the concentrate in colorles crystals, M.P. 163° C.

Analysis.—Found: C, 43.0; H, 3.6%. $C_{10}H_{10}O_3N_2Cl_2$ requires: C, 43.3; H, 3.6%.

Compounds of the above general formula in which Y represents a cyano group have negligible herbicidal activity but very high fungicidal activity. They are particularly toxic to bunt (*Tilletia caries*), a seed-borne fungus infection, and in this compare very favorably with the organo mercurial standard fungicides used in seed-dressings for combatting this fungus. Thus, compared with the standard fungicide comprising 7:1 to 15:1 parts by weight mixtures of phenylmercury acetate and ethylmercury chloride, 2,6-dichloro-alpha-cyanobenzaldoxime is equally effective in controlling bunt while 2,4-dichloro-alpha-cyanobenzaldoxime is more effective. 2,4-dichloro-alpha-cyanobenzaldoxime is not only effective as a seed disinfectant but is also effective as a seed protectant. Pea and bean seeds treated with a dust containing 50% by weight of this compound and an inert filler at the rate of 2 grams per kilogram of seed and then planted in *Pythium* infested soil receive the same degree of protection against this damping-off organism as is given by TMTD (tetramethylthiuram disulphide) dust. These alpha-cyanobenzaldoximes have the great advantage over the organo mercurial fungicides in possessing relatively low mammalian toxicity. Thus, 2,6-dichloro-alpha-cyano-benzaldoxime is non-toxic to rats at a dosage of 64 milligrams per kilogram of body weight. These alpha-cyanobenzaldoximes are therefore preferred compounds of the invention. Seed dressing compositions containing said alpha-cyanobenzaldoximes as a fungicidal ingredient are a further feature of the invention. These compositions my contain one or more other pesticides, particularly fungicides or insolution only were also carried out. The phytotoxic effect of the benzaldoxime applied was assessed by determining the reduction from the control in fresh weight of stem and leaf of the test plants and a regression curve relating growth inhibition and dosage plotted. The dosage of the benzaldoxime derivative required for 50% (G.I.D. 50) and 90% (G.I.D. 90) inhibition of foilage growth is given in the table. Dosages greater than 10 pounds per acre are indicated by X. It can be seen from the table that most of the benzaldoxime derivatives cause 90% growth inhibition in the soil spray test at dosages of 2 pounds per acre or less, 2,6-dichloro-alpha-aminobenzaldoxime hydrochloride being outstanding.

*Table*

HERBICIDAL ACTIVITY OF SOME ALPHA-SUBSTITUTED BENZALDOXIMES

| Name | 50% growth inhibition dose lb./acre ||||||| 90% growth inhibition dose lb./acre |||||||
|---|---|---|---|---|---|---|---|---|---|---|---|---|---|---|
| | Seeds || Plants ||||| Seeds || Plants |||||
| | Soil spray || Foliar Spray || Soil drench ||| Soil spray || Foliar spray ||| Soil drench |||
| | O | M | O | M | L | O | M | L | O | M | O | M | L | O | M | L |
| α-Hydrazino-2,6-dichlorobenzaldoxime | <2.9 | <2.9 | <2.4 | X | X | <2.4 | X | X | <2.9 | <2.9 | X | X | X | X | X | X |
| α-Phenylhydrazin-2,6-dichlorobenzaldoxime | 2.2 | 8.4 | X | X | X | X | X | X | 4.8 | X | X | X | X | X | X | X |
| α-Ureido-2,6-dichlorobenzaldoxime | 1.1 | 2.8 | X | X | X | 2.0 | X | X | 1.7 | 7.0 | X | X | X | X | X | X |
| α-4-Methylphenylthio-2,6-dichlorobenzaldoxime | 9.8 | 9.1 | X | X | X | X | X | X | X | X | X | X | X | X | X | X |
| α-Benzene-sulphonyl-2,6-dichlorobenzaldoxime | 3.3 | X | X | X | X | 3.9 | X | 7.4 | 5.3 | X | X | X | X | 8.5 | X | X |
| O-acetyl-α-2,6-dichlorobenzaldoxime | <0.9 | <0.9 | X | X | X | 3.6 | X | X | <0.9 | <0.9 | X | X | X | X | X | X |
| α-Methylamino-2,6-dichloro-benzaldoxime | 2.3 | 4.1 | X | X | X | 6.2 | X | 5.8 | 3.4 | 6.3 | X | X | X | X | X | X |
| α-Methylamino-2,6-dichlorobenzaldoxime HCl | 1.1 | 4.4 | X | X | X | 6.6 | X | X | 2.1 | X | X | X | X | X | X | X |
| α-Dimethylamino-2,6-dichlorobenzaldoxime | 1.8 | 2.7 | X | X | X | 5.7 | X | 6.2 | 3.2 | 3.9 | X | X | X | X | X | X |
| α-Allylamino-2,6-dichlorobenzaldoxime | 2.4 | 4.7 | X | X | X | 4.2 | 7.0 | 2.1 | 3.3 | 7.1 | X | X | X | X | X | X |
| α-Allylamino-2,6-dichlorobenzaldoxime hydrochloride | 0.9 | 1.9 | X | X | 5.5 | 1.4 | 6.6 | 2.9 | 1.7 | 3.3 | X | X | X | X | X | X |
| α-Iso-butylamino-2,6-dichlorobenzaldoxime | 1.8 | 3.8 | X | X | X | 5.0 | X | X | 3.3 | 6.3 | X | X | X | X | X | X |
| α-Ethanolamino-2,6-dichlorobenzaldoxime | 2.0 | 2.6 | X | X | X | 5.0 | 8.0 | 6.7 | 3.5 | 3.7 | X | X | X | X | X | X |
| α-Diethanolamine-2,6-dichlorobenzaldoxime | 1 | 6.5 | X | X | X | 6.6 | X | X | 1.0 | 9.8 | X | X | X | X | X | X |
| α-Chloro-2,6-dichlorobenzaldoxime | <2 | 2.4 | X | <1 | 3.9 | 5.0 | X | X | <2 | 6.9 | X | 3.6 | 6.2 | 10.0 | X | X |
| α-Cyano-2,6-dichlorobenzaldoxime | 7.9 | X | X | X | X | X | X | X | X | X | X | X | X | X | X | X |
| α-Thiocyanato-2,6-dichlorobenzaldoxime | <2.9 | <2.9 | 4.5 | X | X | 2.8 | 6.5 | X | <2.9 | <2.9 | 8.6 | X | X | X | X | X |
| α-Nitro-2,6-dichlorobenzaldoxime | <2 | <2 | <1 | <1 | X | <1 | <1 | 2.0 | <2 | <2 | 9.0 | 9.2 | X | 7.4 | 7.2 | 8.5 |
| 2,6-dichloro-α-hydroxylamino-benzaldoxime hydrochloride | 0.6 | <0.9 | X | 4.4 | X | 1.2 | 5.4 | 8.0 | 1.1 | 1.8 | X | 8.8 | X | X | X | X |
| α-Amino-2,6-dichlorobenzaldoxime | <0.6 | 1.4 | 5.4 | 6.7 | X | 6.8 | X | X | 2.0 | 2.3 | X | X | X | X | X | X |
| α-Amino-2,6-dichlorobenzaldoxime hydrochloride | <0.6 | <0.6 | 2.1 | 7.2 | X | <1 | 2.8 | 4.0 | <0.62 | 1.2 | X | X | X | X | X | X | secticides. Advantageously, dimethylformamide is a component of these compositions. The use of these alpha-cyanobenzaldoximes and of compositions containing them, as fungicides particularly for the dressing of seed for the control of bunt, is included in the scope of the invention.

High herbicidal activity is exhibited by compounds of the above general formula which are substituted in the alpha-position by halogen, preferably chlorine or bromine, or by thiocyano or nitro groups. Other highly active herbicidal compounds are those substituted in the alpha-position by hydroxylamino, amino, substituted amino, hydrazino or ureido groups, the salts of these compounds, for example, the hydrochlorides, sulphates, nitrates etc. being comparable with the bases in activity. The results of herbicidal tests carried out with some of the more active compounds of the invention are summarized in the following table. These tests were carried out as follows:

Aqueous compositions containing acetone (40 v.), water (60 v.), Triton X-155 (0.5% w./v.) and the benzaldoxime derivative in logarithmically varying concentrations were used. In the soil spray and soil drench tests, imbibed seeds of oats (O) and mustard (M), and seedling plants of oats, mustard and linseed (O,M,L) respectively, in sterile No. 1 John Innes compost, were sprayed at 50 gallons per acre or drenched at 1000 gallons per acre. In the foliage test, similar plants of oats, mustard and linseed were sprayed with a volume equivalent to 50 gallons per acre. Control tests in which seeds or plants were sprayed and/or drenched with the aqueous acetone-Triton X-155 solution only were also carried out.

It can be seen further that most of the compounds have similar degrees of activity to both monocotyledons and dicotyledons so that these compounds are effective total pre-emergence herbicides. The table also shows the very low herbicidal activity of 2,6-dichloro-alpha-cyano-benzaldoxime referred to previously as a fungicide.

The invention also relates to a method of protecting crop plants from undesirable competition with weeds or from attack by seed- or soil-borne fungus diseases which comprises pretreating the soil in which the crop is to be grown with an alpha-substituted benzaldoxime of the invention having as the alpha-substituent a halogen, preferably chlorine or bromine atom, a thiocyano or nitro group, or a hydroxylamino, amino, substituted amino, hydrazino or ureido group, as the free base or in salt form, or with an alpha-cyanobenzaldoxime respectively.

Alpha-2,6-trichlorobenzaldoxime, in addition to its high fungicidal activity, is also very toxic to aquatic snails, particularly to *Australorbis glabratus, Planorbis corneus* and *Bulinus truncatus,* which are known carriers of the parasite carrying bilharziasis in man. Alpha-2,4,6-tetrachlorobenzaldoxime and its O-acetyl derivative, alpha-benzenesulphonyl-2,6-dichlorobenzaldoxime and O-acetyl-alpha-2,6-trichlorobenzaldoxime are also effective molluscicides. These compounds cause the death of snails in 24 hours at dosages of as little as one part per million.

This invention relates further to compositions comprising an alpha-substituted benzaldoxime as hereinbefore specified and a carrier or a surface active agent or a carrier and a surface active agent.

The term "carrier" as used herein means a material, which may be inorganic or organic and synthetic or of natural origin, with which the active substance is mixed or formulated to facilitate its storage, transport and handling and its application to the plant, seed, soil or other object to be treated. The carrier is preferably biologically and chemically inert. It may be a solid or a fluid. Solid carriers are preferably particlate, granular or pelleted though other shapes and sizes are not thereby excluded. Solid carriers, generally obtainable in particulate, granular or pelleted form, may be naturally occurring minerals, though they may have been subjected to grinding, sieving, purification and other treatments, for example, gypsum, tripolite, diatomite, mineral silicates such as mica, vermiculite, talc and pyrophylite and clays of the montmorillonite, kaolinite or attapulgite groups, calcium or magnesium limes or calcite and dolomite. Carriers produced synthetically, for example, synthetic hydrated silicon oxides and synthetic calcium silicates may also be used and many proprietary products of this type are available commercially. The carrier may also be an elemental substance such as sulphur or carbon, preferably an activated carbon. If the carrier possesses intrinsic catalytic acidity such that it would decompose the toxicant it is advantageous to incorporate a stabilizing agent, for example, urea or hexamethylene tetramine, to neutralise this acidity and so prevent possible decomposition of the benzaldoxime.

For some purposes, a resinous or waxy carrier may be used, preferably one which is solvent soluble or thermoplastic, including fusible. Examples of such carriers are natural or synthetic resins such as a coumarone resin, rosin, copal, shellac, dammar, polyvinyl chloride, styrene, polymers and copolymers, a solid grade of polychlorophenol such as is available under the registered trademark "Aroclor," a bitumen, an asphaltite, a wax, for example, beeswax or a mineral wax such as paraffin wax or montan wax, or a chlorinated mineral wax. Compositions comprising such resinous or waxy carriers are preferably in granular or pelleted form.

Fluid carriers may be liquids, for example, water or an organic fluid including a liquefied normally vaporous or gaseous material, or a vaporous or gaseous material, and may be solvents or non-solvents for the active material. Horticultural petroleum spray oils boiling in the range 275° to 575° F. or boiling in the range 575° to 1000° F. and having an unsulphonatable residue of at least 75% and preferably of at least 90%, or a mixture of these two types of oil are particularly suitable liquid carriers.

The carrier may also be a simple or compound fertilizer which may be a solid, preferably granular or pelleted, or a liquid, for example an aqueous solution.

The carrier may be mixed or formulated with the active material during its manufacture or at any stage subsequently. The carrier may be mixed or formulated with the active material in any proportion. One or more carriers may be used.

The compositions of the invention may be concentrates, suitable for storage or transport and containing, for example, from 10 to 95% by weight of the substituted benzaldoxime. These can be diluted with the same or a different carrier to a concentration suitable for application. The compositions of the invention may also be dilute compositions suitable for application. In general, concentrations of 0.01 to 0.5% by weight, of active material based on the total weight of the composition are satisfactory, though lower and higher concentrations can be applied if necessary. Effective week control is obtainable by applying the compositions at the rate of 1 to 20 pounds per acre of a herbicidally active benzaldoxime.

The compositions of the invention may be formulated as dusts. These comprise an intimate mixture of the benzaldoxime and a finely powdered solid carrier such as is indicated above. These powder carriers may be oil-treated to improve adhesion to the surface to which they are applied. These dusts may be concentrates, in which case a highly sorptive carrier is preferably used. These require to be diluted with the same or a different finely powdered carrier, which may be of lower sorptive capacity, to a concentration suitable for application.

The compositions of the invention may be formulated as wettable powders comprising a major proportion of the benzaldoxime mixed with a dispersing, i.e. deflocculating or supending, agent and, if desired, a finely divided solid carrier. The benzaldoxime may be in particulate form or adsorbed on the carrier and preferably constitutes at least 10%, more preferably at least 50% by weight of the composition. The concentration of the dispersing agent should in general be between 0.1 and 10% by weight of the total composition though larger or smaller amounts may be used if desired.

The dispersing agent used in the composition of the invention may be any substance having definite dispersing, i.e. deflocculating or suspending, properties as distinct from wetting properties, although these substances may also possess wetting properties.

The dispersing agent used may be protective colloid such as gelatin, glue, casein, gums or a synthetic polymeric material such as polyvinyl alcohol. Preferably, however, the dispersing agents used are sodium or calcium salts of high molecular weight sulphonic acids, e.g. the sodium or calcium salts of lignin sulphonic acids derived from sulphite cellulose waste liquors. The calcium or sodium salts of condensed aryl sulphonic acids, for example the product known as "Tamol 731," are also suitable.

The dispersing agents used may be non-ionic emulsifiers, for example the condensation products of fatty acids containing at least 12, preferably 16 to 20, carbon atoms in the molecule, or of abietic acid or naphthenic acids obtained in the refining of petroleum lubricating oil fractions, with alkylene oxides such as ethylene oxide or propylene oxide or with both ethylene oxide and propylene oxide as, for example, the condensation product of oleic acid and ethylene oxide containing 6 ethylene oxide units in the molecule. Partial esters of the above acids with polyhydric alcohols such as glycerol, polyglycerol, sorbitol or mannitol may also be used.

The dispersing agents referred to above may also possess wetting properties but in general it is preferably to incorporate two separate surface active agents, one having particularly good dispersing properties and the other having particularly good wetting properties. The actual amount of wetting agent incorporated can be varied considerably and in general is from 0 to 10% by weight based on the total composition.

Suitable wetting agents include the alkali metal salts, preferably sodium salts, of sulphuric acid esters or sulphonic acids containing at least 10 carbon atoms in the molecule, for example, the sodium secondary alkyl sulphates available under the registered trademark "Teepol," sodium salts of sulphonated castor oil, sodium dodecyl benzene sulphonate. Non-ionic wetting agents may also be employed for example, polyalkylene oxide polymers, e.g. the "Pluronics," and condensation products of polyalkylene oxides with aromatic nuclei (e.g. octyl cresol).

Granulated or pelleted compositions comprising a suitable carrier having a benzaldoxime incorporated therewith are also included in the invention. These may be prepared by impregnating a granular carrier with a solution of the benzaldoxime or by granulating a mixture of a finely divided solid carrier and the benzaldoxime. The carrier used may consist of or contain a fertilizer or fertilizer mixture, for example superphosphate.

The compositions of the invention may also be formulated as solutions of benzaldoxime in an organic solvent or mixture of solvents, for example of alcohols, ketones especially acetone, ethers, hydrocarbons. Fungicidal compounds of the invention to be used as seed dressings are preferably dissolved in dimethylformamide (DMF) or in a mixture of dimethylformamide and methanol. A suitable seed dressing formulation comprises for example, 1 to 10% w./v. of alpha-cyano-2,6-dichlorobenzaldoxime and 99 to 90% of DMF or 1:1 mixture of DMF and methanol. Petroleum hydrocarbon fractions used as solvents should preferably have a flash point above 73° F., for example, a refined aromatic extract of kerosene. For use in application of fungicidal compounds to foliage the solvent used should not be phytotoxic and for this purpose a petroleum spray oil boiling in the range 275° to 575° F. or boiling in the range 575° to 1000° F. and having an unsulphonatable residue of at least 75% and preferably of at least 90%, or a mixture of these two types of oil, is preferably used. Auxiliary solvents such as alcohols, ketones and polyalkylene glycol ethers and esters may be used in conjunction with these petroleum solvents. Such oil solutions are particularly suitable for application by low volume spraying for example at the rate of 5 to 10 gallons per acre. They may also be diluted with a cheap solvent for high volume spraying.

Compositions of the present invention may also be formulated as emulsifiable concentrates which are concentrated solutions or dispersions of the benzaldoxime in an organic liquid, preferably a water-insoluble organic liquid, containing an added emulsifying agent. These concentrates may also contain a proportion of water for example up to 50% by volume, based on the total composition (i.e. a "mayonnaise" composition) to facilitate subsequent dilution with water. Suitable organic liquids are for example the above petroleum hydrocarbon fractions as described above.

The emulsifying agent may be of the type producing water-in-oil type emulsions which are suitable for application by low volume spraying, or an emulsifier of the type producing oil-in-water emulsions may be used, producing concentrates which can be diluted with relatively large volumes of water for application by high volume spraying. In such emulsions, the benzaldoxime is preferably in the non-aqueous phase.

Suitable types of emulsifier for use in these emulsions or emulsifiable concentrates are the non-ionic and anionic dispersing and wetting agents described above, also suitable are long chain alkyl ammonium salts and alkyl sulpho-succinates.

The concentration of emulsifier used will in general be within the limits 0.5% and 25.0% based on the final composition.

The compositions of the invention may contain other ingredients, for example, water conditioning agents for example, sodium polyphosphates or cellulose ethers, other herbicides, pesticides or stickers, for example a non-volatile oil.

Aqueous dispersions and emulsions, for example, compositions obtained by diluting the wettable powders or emulsifiable concentrates of the present invention with water also lie within the scope of the present invention.

We claim as our invention:
1. A compound of the group consisting of (a) an alpha-substituted benzaldoxime of the formula,

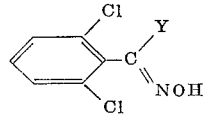

wherein Y is selected from the group consisting of hydrazino, ureido, amino (—NH$_2$), hydroxylamino (—NHOH), thiocyanato, monoalkyl- and monoalkanolamino of from 1 to 4 carbon atoms, allylamino, dialkyl- and dialkanolamino, wherein each alkyl moiety contains from 1 to 4 carbon atoms, (b) hydrochloric acid addition salts thereof, (c) nitric acid addition salts addition thereof, and (d) sulfuric acid addition salts thereof.

2. Alpha-hydrazino-2,6-dichlorobenzaldoxime.
3. Alpha-amino-2,6-dichlorobenzaldoxime hydrochloride.
4. Alpha - hydroxyl - amino - 2,6 - dichlorobenzaldoxime hydrochloride.
5. Alpha - methyl - amino - 2,6 - dichlorobenzaldoxime hydrochloride.
6. Alpha - allylamino - 2,6 - dichlorobenzaldoxime hydrochloride.
7. Alpha-ureido-2,6-dichlorobenzaldoxime.
8. Alpha-thiocyanato-2,6-dichlorobenzaldoxime.

References Cited by the Examiner

UNITED STATES PATENTS

| | | | |
|---|---|---|---|
| 1,996,007 | 3/1935 | Hanas | 260—566 |
| 2,435,274 | 2/1940 | Hester | 167—30 |
| 2,201,156 | 5/1940 | Coleman et al. | 260—454 |
| 2,486,090 | 10/1949 | Abramovitch | 260—454 |
| 2,668,115 | 2/1954 | Wolf | 260—566 |
| 2,965,537 | 12/1960 | Rosen | 167—30 |

OTHER REFERENCES

Farley et al.: Proc. N. Dakota Acad. Sci. 13, 61–5 (1959).

Perrot Academic des Sciences (France), Comptes Rendus 199, 585–7 (1934).

Werner et al.: Ber. Deut. Chem., vol. 32, pp. 1975–1985 (1899).

CHARLES B. PARKER, *Primary Examiner.*

LEON ZITVER, JOSEPH P. BRUST, *Examiners.*